United States Patent [19]
Carr

[11] Patent Number: 6,165,537
[45] Date of Patent: Dec. 26, 2000

[54] METHOD OF MAKING A FOOD PRODUCT CONTAINING TOMATOES

[75] Inventor: Helmi E. Carr, Leesburg, Va.

[73] Assignee: Fort Evans Finest, LLC, Leesburg, Va.

[21] Appl. No.: 09/471,242

[22] Filed: Dec. 23, 1999

[51] Int. Cl.[7] .............................. A23L 1/39; A23L 1/48
[52] U.S. Cl. ..................... 426/602; 426/589; 426/599; 426/615
[58] Field of Search .................... 426/589, 602, 426/615, 599

[56] References Cited

U.S. PATENT DOCUMENTS

| | | |
|---|---|---|
| 826,175 | 7/1906 | Lattard . |
| 1,354,563 | 10/1920 | Jaeger et al. . |
| 2,916,383 | 12/1959 | Nasarevich et al. . |
| 3,366,489 | 1/1968 | Wagner ................................. 426/599 |
| 3,366,490 | 1/1968 | Wagner ................................. 426/599 |
| 3,892,877 | 7/1975 | Wagner ................................. 426/599 |
| 3,976,805 | 8/1976 | Becker ................................. 426/599 |
| 4,547,375 | 10/1985 | Mersfelder ........................... 426/589 |
| 5,914,146 | 6/1999 | Vallejo ................................. 426/599 |

OTHER PUBLICATIONS

Anon 1968 A Campbell Cookbook Cooking with Soup Campbell Soup Company pp. 60, 61, 81, 82.

Anon 1965 The Art of Mexican Cooking. Doubleday & Company New York pp. 52, 53, 146, 266, 267.

Dent 1985 The Feast of Santa Fe Simon & Schuster New York pp. 86–92.

Rombauer 1975 Joy of Cooking a Plume Book pp. 171, 360, 361, 528.

"Cooking with Soup", A Campbell Cookbook, 1968, pp. 81–82.

"Favorite Brand Name Recipes Cookbook", Publications International, Ltd., 1991, pp. 63, 92–93.

*Primary Examiner*—Carolyn Paden
*Attorney, Agent, or Firm*—Dinesh Agarwal, P.C.

[57] ABSTRACT

A method for preparing a food compound, and particularly a salad dressing with a unique flavor and improved taste, includes providing preselected quantities of a tomato-based product and a vegetable oil, combining the tomato-based product with the vegetable oil and heating to a temperature of about 100°–160° F., stirring the combined mixture substantially simultaneously with heating while making certain it does not come to a boil, adding sugar to the heated combined mixture and blending thoroughly until the sugar is dissolved, refrigerating the mixture so obtained for about 2–5 hours at a temperature of about 36°–46° F., adding preselected quantities of vinegar, a vegetable-based sauce, and onion to the refrigerated mixture and mixing for about 15 seconds to 4 minutes, and refrigerating the mixture again at a temperature of about 36°–46° F. The food compound is prepared from a unique blend of natural and healthy ingredients.

13 Claims, 2 Drawing Sheets

METHOD OF MAKING A FOOD PRODUCT CONTAINING TOMATOES

FIELD AND HISTORICAL BACKGROUND OF THE INVENTION

The present invention is directed to a food compound and method of preparing the same. In particular, the present invention is directed to making a salad dressing which is prepared from a unique blend of natural and healthy ingredients and has a unique flavor.

As technological advances take place and the society moves into the next millennium, our habits and taste change in accordance therewith. In particular, as the body of research grows larger, the scientists learn more about the effects of various food items, consumed daily, on our health. For example, in relatively recent studies the scientists, particularly health professionals, learned the is adverse effects of a fatty substance, known as "cholesterol". One of the major sources of cholesterol is the yolk portion of an egg, a fairly common item of breakfast in our daily diet. It is now common knowledge that high amounts of cholesterol could lead to arteriosclerosis which causes heart-attack. As a result of this discovery, the Government has established recommended levels of cholesterol to prevent the occurrence of this deadly disease.

Another major medical discovery of this century has been the adverse effects of animal protein or fat on people's health. Animal meat, particularly beef, has been a major source of protein in the daily diet of the people in this century. The adverse effects of animal protein and fats have, however, led people to severely cut back on the consumption thereof and switch their diet to include non-animal protein and fat.

Many new scientific discoveries, including those noted above, have shifted the industry's attention to seek alternatives in making food items that provide the recommended daily level of nourishment without adversely affecting the health, while keeping in mind our insatiable desire for new and improved taste. In particular, the consumers have expressed preference to those food items that are less fattening, low in cholesterol, contain more natural and healthy ingredients. As a result, the industry responded by producing food items that were low in fat or contained fat substitutes, etc.

Although the industry has produced countless numbers of food items that are low in fat, low in calories, and apparently more healthy, it has been challenging to provide a food product which is low in fat, healthy, and yet satisfies consumers' constant urge for a new and better taste. This phenomenon is no more visible than in salad dressings. As the consumers switched their diets to more natural and healthy ingredients, such as vegetables and fruits, the food industry responded by providing numerous varieties of salad dressings. One merely need to visit a local grocery store to see many different varieties of salad dressings that adorn the shelves. However, many of these dressings either require the use of a large quantity to be palatable, or are not considered healthy in that they do contain egg yolks, etc.

Accordingly, there is a need in the industry for a salad dressing which is prepared from a unique blend of natural and healthy ingredients, and coats the salad with its unique flavor while not having to use an excessive amount as in most conventional dressings.

OBJECTS AND BRIEF SUMMARY OF THE INVENTION

The principal object of the present invention is to provide a food compound, and particularly a salad dressing, which overcomes the drawbacks associated with conventional dressings.

An object of the present invention is to provide a salad dressing which is prepared from a unique blend of natural and healthy ingredients.

Another object of the present invention is to provide a salad dressing which coats the salad with its unique flavor and does not require the use of an excessive amount.

An additional object of the present invention is to provide a salad dressing which does not use egg yolk.

Yet an additional object of the present invention is to provide a method of preparing a food compound, such as a salad dressing, which is prepared from a unique blend of natural and healthy ingredients, and which coats the salad with its unique flavor without having to use an excessive amount thereof.

In summary, the main object of the present invention is to provide a food compound in the form of a salad dressing, and a method of preparing the same, wherein the dressing is made from a unique blend of natural and healthy ingredients. The salad dressing made in accordance with the present invention has a unique flavor and does not require the use of a large amount for coating the salad.

BRIEF DESCRIPTION OF THE DRAWINGS

The above and other objects, novel features and the advantages of the present invention will become apparent from the following detailed description of the invention, shown in the accompanying drawings, in which.

DETAILED DESCRIPTION OF THE INVENTION

The present invention, while not limited to, contemplates preparing a unique salad dressing with or without blue cheese. In carrying out the method of the invention, various ingredients are first selected and prepared in the quantities or proportions (by weight), shown below in Table 1.

TABLE 1

| INGREDIENT | RANGES | PREFERRED RANGES |
|---|---|---|
| A. Tomato-Based Product | About 26–29% | About 28.6–28.9% |
| B. Vegetable Oil | About 19–22% | About 21.3–21.5% |
| C. Sweetening Agent | About 19–22% | About 21.3–21.5% |
| D. Vinegar | About 19–22% | About 21.3–21.5% |
| E. Vegetable Sauce | About 1–2.5% | About 1.3–2.2% |
| F. Vegetable | About 4–5.5% | About 5.3–5.4% |
| G. Milk Product | About 0–6.6% | About 0–6.6% |

The following Table 2 lists different varieties for the ingredients that may preferably be used in carrying out the invention.

TABLE 2

| INGREDIENT | VARIETIES |
|---|---|
| A. Tomato-based product | Tomato Soup and Tomato Puree |
| B. Vegetable Oil | Corn Oil, Light Olive Oil and Canola Oil |
| C. Sweetening Agent | Sucrose and Fructose |
| D. Vinegar | Red Wine Vinegar, White Wine Vinegar, Rice Vinegar, Apple Cider Vineger and Distilled Vinegar |

TABLE 2-continued

| INGREDIENT | VARIETIES |
| --- | --- |
| E. Vegetable Sauce | A-1 ® Sauce, Heinz 57 ® and French's ® Worcestershire Sauce |
| F. Vegetable | Raw Onions, Dehydrated Onions, Dehydrated Minced Onions |
| G. Milk Product | Blue Cheese |

Once the ingredients have been selected in the desired amounts, the following method of the invention is observed.

Figure 1:
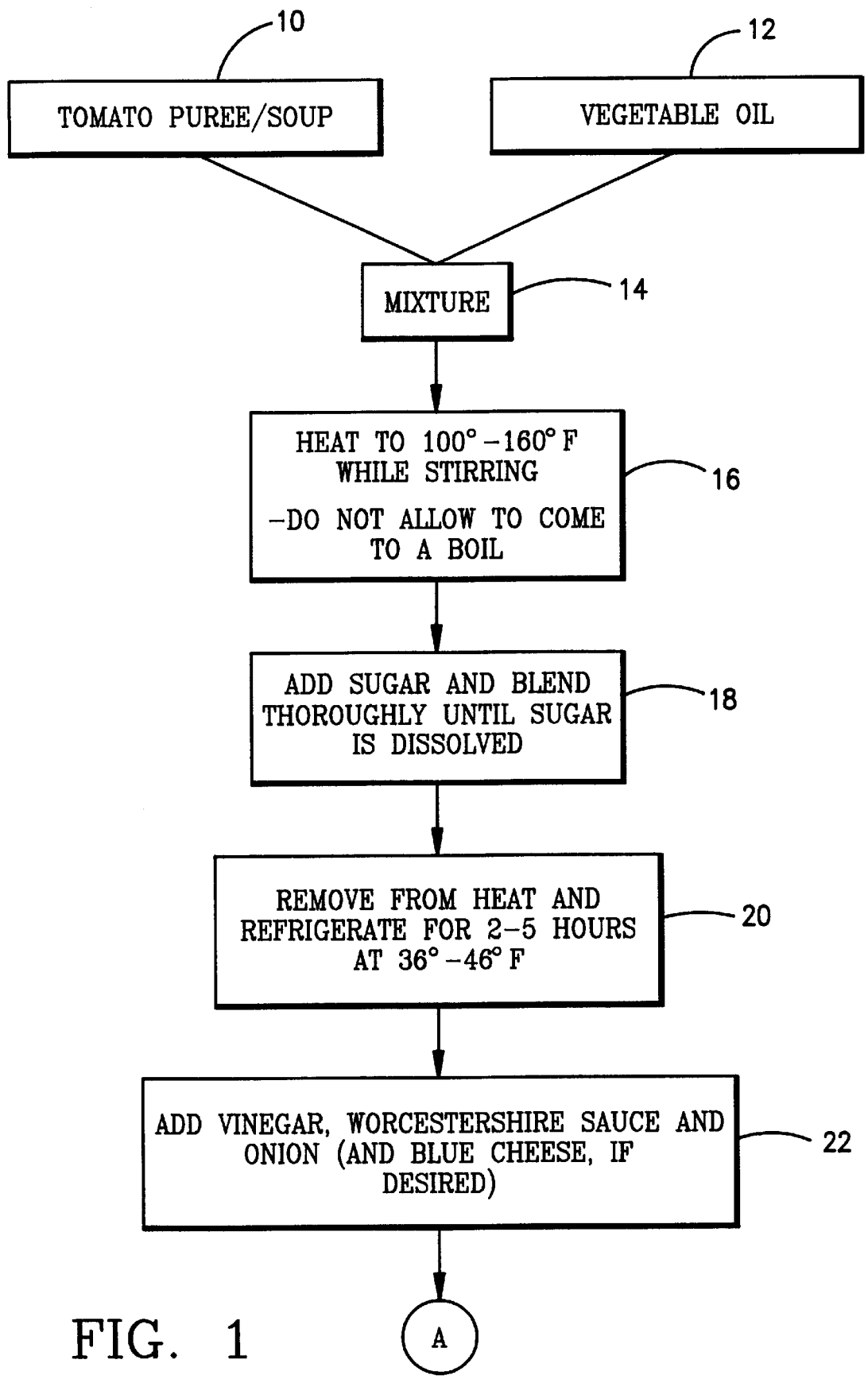
FIGS. 1 and 2 show a flow chart of the method of the invention.

As shown in FIG. 1, the selected tomato-based product 10, preferably a tomato soup, is mixed with a vegetable oil 12. The combined homogenized mixture 14 is then heated to a temperature of about 100°–160° F. (see block 16 in FIG. 1). The mixture 14 is gently stirred simultaneously with heating. Although the mixture 14 is heated, it is important that it does not come to a boil. Upon the mixture 14 reaching the temperature of 100°–160° F., a sweetening agent, preferably sugar, is then added and blended thoroughly until it is completely dissolved (see block 18 in FIG. 1).

The sweetened mixture or homogenized solution so obtained is then removed from heat and refrigerated for about 2–5 hours at a temperature of about 36°–46° F. (see block 20 in FIG. 1). The refrigerated mixture is then removed to add preselected quantities of vinegar, a vegetable-based sauce, preferably French's® Worcestershire sauce, and raw onion (see block 22 in FIG. 1). (It is noted herewith that, if desired, preferably crumbled blue cheese is added in step 22).

Figure 2:
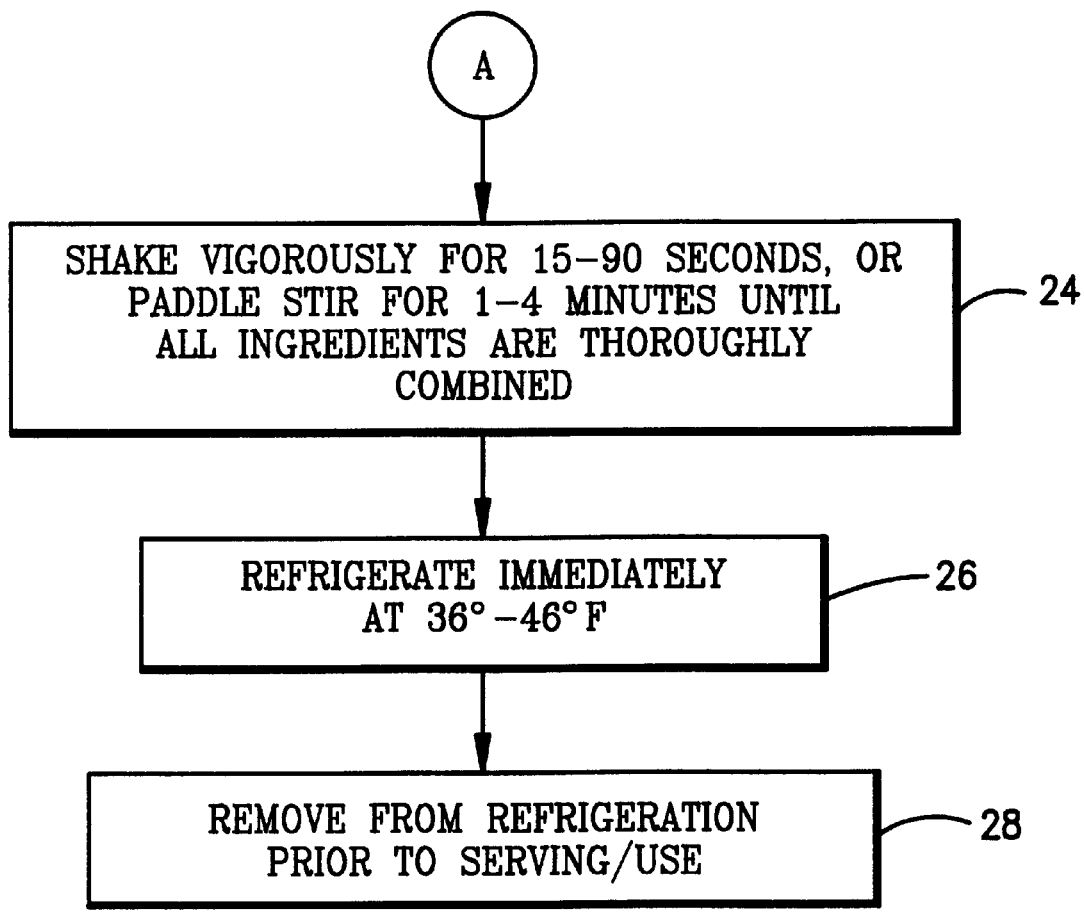

The mixture so obtained is then shaken vigorously for about 15–90 seconds, or paddle-stirred for about 1–4 minutes until all the ingredients are thoroughly combined (see block 24 in FIG. 2). The resultant mixture is then refrigerated immediately at 36°–46° F. (see block 26 in FIG. 2). The food compound, or the salad dressing, so prepared may then be removed from refrigeration for packaging or use (see block 28 in FIG. 2).

The following is a non-limiting example of the invention.

EXAMPLE 1

| INGREDIENT | AMOUNT |
| --- | --- |
| Campbell's ® Classic Tomato Soup | 5.375–16.125 ounces (½–1½ cans) |
| Vegetable Oil | 4.0–2.00 ounces (½–1½ cups) |
| Heinz ® Apple Cider Vinegar | 4.0–12.00 ounces (½–1½ cups) |
| Refined Sugar | 4.0–12.00 ounces (1½ cups) |
| French's ® Worcestershire Sauce | 0.25–1.25 ounces (2 tablespoons) |
| Finely grated raw onions | 1.00–3.00 ounces |
| TOTAL | 18.625–56.375 oz. |

As may be noted from above, the food compound, and particularly the salad dressing, of the present invention is prepared by using only the natural and healthy ingredients which, when processed in accordance with the method outlined above, produce a salad dressing that has a new and unique flavor. In addition, the method of the invention produces a salad dressing which does not require the use of an excessive amount, as in most other conventional dressings, and yet uses only the natural and healthy ingredients.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims. It is further understood that the present invention is not limited to the claims appended hereto.

What is claimed is:

1. A method for preparing a food compound, comprising the steps of:

a) providing preselected quantities of a tomato-based product and a vegetable oil;

b) combining the tomato-based product with the vegetable oil and heating to a temperature of about 100°–160° F.;

c) stirring the combined mixture of step (b) substantially simultaneously while heating;

d) adding sugar to the heated combined mixture of step c) and blending thoroughly until the sugar is dissolved;

e) refrigerating the mixture obtained in step d) for about 2–5 hours at a temperature of about 36°–46° F.;

f) adding preselected quantities of vinegar, a vegetable-based sauce, and onion to the refrigerated mixture obtained in step e) and mixing for about 15 seconds to 4 minutes; and g) refrigerating the mixture obtained in step b) at a temperature of about 36°–46° F.

2. The method of preparing a food compound of claim 1, wherein:

the heating step b) is carried out without boiling the combined mixture.

3. The method of preparing a food compound of claim 2, wherein:

the mixing step f) comprises vigorously shaking the mixture for about 15–90 seconds.

4. The method of preparing a food compound of claim 2, wherein:

the mixing step f) comprises stirring the mixture with a paddle for about 1–4 minutes.

5. The method of preparing a food compound of claim 1, wherein:

the step b) comprises heating the combined mixture to a temperature of about 140° F.

6. The method of preparing a food compound of claim 1, wherein:

the step e) comprises refrigerating the mixture at a temperature of about 40°–42° F.

7. The method of preparing a food compound of claim 1, wherein:

the vegetable oil in step a) is selected from the group consisting of corn oil, olive oil, and canola oil.

8. The method of preparing a food compound of claim 1, wherein:

the tomato-based product in step a) is selected from the group consisting of tomato puree and tomato soup.

9. The method of preparing a food compound of claim 1, wherein:

the vinegar in step f) is selected from the group consisting of red wine vinegar, white wine vinegar, rice vinegar, apple cider vinegar, and distilled vinegar.

10. The method of preparing a food compound of claim 1, wherein:

the onion in step f) is selected from the group consisting of raw onion and dehydrated onion.

11. The method of preparing a food compound of claim 1, further comprising the step of:

h) adding a milk product in step f).

12. The method of preparing a food compound of claim 11, wherein:

the milk product comprises a blue-veined cheese.

13. The method of preparing a food compound of claim 1, wherein:

the vegetable-based sauce in step f) comprises a sauce made with soy, vinegar and spices.

* * * * *